3,244,679
POLYMETHACRYLIC ACID IMIDES PREPARED BY THE REACTION OF POLYMETHACRYLIC ACID ESTERS WITH AMMONIUM SALTS
Günter Schröder, Darmstadt, Germany, and Klaus Tessmar, deceased, late of Darmstadt, Germany, by Ruth H. Tessmar, heir, Darmstadt, Germany, assignors to Rohm & Haas G.m.b.H., Darmstadt, Germany
No Drawing. Filed Mar. 19, 1962, Ser. No. 180,879
Claims priority, application Germany, Mar. 22, 1961, R 29,934
6 Claims. (Cl. 260—86.1)

This invention relates to methods of making polymethacrylic acid imides.

It is known from German patent specification 1,077,872 that derivatives of polymethacrylic acid containing imide groups can be prepared by reaction of polymethylmethacrylate with aqueous ammonia at 180°–300° C. under pressure.

In such a process, alkylations occur as side reactions, so that the reaction product contains N-alkyl imide groups, as well as imide groups. In many cases, particularly if polymer products with a high resistance to deformation by heat are sought, the presence of such N-alkyl imide groups is undesirable.

It has now been found, that, surprisingly, solutions of ammonium salts react with polymethacrylic acid esters at temperatures from about 180° C. to about 300° C. with formation of polymethacrylic acid imides and without the interference of alkylation reactions.

Preferably, polymethacrylic acid esters having up to 6 carbon atoms in the alcohol portion are employed as starting materials, e.g. esters of alkanols such as methanol, ethanol, pentanol, hexanol, etc. Also, copolymers containing methacrylic acid esters copolymerized with other methacrylyl monomers including methacrylic acid, methacrylonitrile, α-methyl styrene, and methacrylamide, or with vinylic monomers such as acrylonitrile, styrene and substituted styrenes, vinyl chloride, and vinylidene chloride, are adaptable to the reaction. In these copolymers, the methacrylyl monomers other than the esters may be present in amounts up to about 70 percent by weight of the polymer, and the vinyl monomers in amounts up to about 45 percent.

As ammonium salts, ammonium carboxylates, particularly ammonium lower lkyl carboxylates such as ammonium acetate, ammonium formate, and the like, or ammonium salts of inorganic acids such as ammonium sulfate, ammonium dihydrogen phosphate, di-ammonium hydrogen phosphate, etc. can be employed. These, or other soluble ammonium salts are used either in aqueous solution or in solution with a polyhydroxy alcohol, particularly unsubstituted aliphatic polyhydroxy alcohols such as ethylene glycol, glycerine, butanediol-1,3, and butanediol-1,4. Mixtures of water and one or more polyhydroxy alcohols in any proportion can also be employed as the solvent. The use of a polyhydroxy alcohol as a solvent has advantages in certain cases since the reaction can be carried out at atmospheric pressure, whereas the use of aqueous solutions requires the use of pressure vessels, the reaction proceeding under the autogenous pressure of the system.

The proportion of ammonium salt to ester used can vary between wide limits depending on whether a complete or only a partial imidization is desired. In case a complete replacement of the ester groups by imide groups is desired, it is preferred to use about 1.5 to about 2 mols of ammonium salts per mol of ester groups. Lower ratios of salt to ester groups, e.g. 0.1 to 1, will give partially imidized products.

The reaction products produced by the methods of the present invention, as compared with those of German patent specification 1,077,872, show not only a complete absence of N-alkyl imide groups, but also their water uptake on swelling is greater than that of the known products, which is particularly significant for the use of the products in the prepartion of textile fibers. A further advantage of the present products is that the products are not obtained in a cohered condition, which is not the case for the products obtained using aqueous ammonia because of hydrolysis reactions simultaneously occurring to a certain extent in the latter case because of the alkalinity of the treating solutions. The addition of electrolytes, for example, potassium chloride, has already been proposed to avoid the formation of clumps. This, however, has the disadvantage that the end products always have an ash content. To the extent that this ash content is due to the formaion of carboxylate groups in the macromolecule, it cannot be obviated by washing.

It should be mentioned that it is possible to react polymethacrylate esters according to the present invention with mixtures of ammonia and ammonium salts in certain proportions in order to obtain a desired degree of alkylation. Also, lower alkyl-ammonium salts such as methyl ammonium acetate can be used in place of, or together with, ammonium salts in the present process in the same amounts and in the same solvents hereinbefore mentioned. The alkyl ammonium cations may be substituted with methyl, ethyl, propyl, butyl, etc. groups: the anions may be organic or inorganic, as for unsubstituted ammonium salts. Of course, in such treatment, polymeric N-alkyl imides are produced. However, since a neutral medium is employed, no hydrolysis and clump formation occurs, in contrast to the reaction with aqueous amines. Additionally, the formation of trimethyl amine during the reaction is avoided, which material is troublesome because of its unpleasant odor.

The products prepared according to the present invention are insoluble in the reaction medium, but can be dissolved in dimethylformamide or concentrated formic acid and used to form films and fibers. Further, the materials can be converted into finished or partially finished structures by pressure molding, injection molding, extrusion, rolling, or the like. These are characterized by a high impact resistance, good resistance to solvents, and a good resistance to deformation by heat.

The resistance to deformation by heat is higher the higher the imide content of the polymer. In the preparation of materials for injection molding the temperatures at which the materials are to be worked must be kept in mind and the imide content so chosen that a relatively high resistance to deformation by heat is obtained while retaining a comparatively low working temperature. In general, imide contents of from 30 to 60% by weight, based on the total polymer, are indicated for materials to be injection molded.

A better understanding of the invention and of its many advantages will be had by referring to the following specific examples, given by way of illustration.

*Example 1*

120 g. (1.2 mols) of granulated polymethylmethacrylate, 132 g. (1.0 mol) of di-ammonium hydrogen phosphate, and 1 liter of water were heated at 230° C. for seven hours in an autoclave with stirring. After the reaction, the granular form of the starting material was retained. The individual grains adhered to each other very slightly. A methoxyl analysis showed 15.5% $OCH_3$, which corresponds to 50% of unreacted ester groups. The infrared spectrogram of the product, which was soluble in dimethyl formamide, showed the bands of unreacted ester groups and the bands of polymethacrylimide.

Example 2

120 g. (1.2 mols) of granulated polymethylmethacrylate, 160 g. (1.0 mol) of di-methylammonium hydrogenphosphate, and 1 liter of water were reacted for seven hours in a stirred autoclave at 240°–245° C. The form of the starting material was substantially retained in the reaction product. The loosely cohered reaction product could be subdivided without difficulty. The infrared spectrogram of the material, soluble in dimethyl formamide, is identical with poly-N-methylmethacrylimide.

*Analysis.*—Theoretical: C, 64.2; H, 7.8; N, 8.4. Reported: C, 64.0; H, 7.8; N, 8.1.

Example 3

120 g. (1.2 mols) of polymethylmethacrylate, 34 g. (2.0 mols) of ammonia (as a 25% aqueous solution), 120 g. (2.0 mols) of acetic acid (as a 96% commercial product), and 600 g. of water were heated in a stirred autoclave for seven hours at 230° C. After the reaction, the form of the starting material was retained. The infrared spectrogram of the material, soluble in dimethyl formamide, was indistinguishable from that of polymethacrylimide. A small amount of unreacted methyl ester groups (about 8%) could be determined by a methoxyl analysis.

Example 4

In the same manner as is described in Example 3, an aqueous dispersion of polymethylmethacrylate was reacted. In this case, the reaction product was free of methylmethacrylic ester groups. The product was a white crumbly mass.

Example 5

100 g. (1.0 mol) of polymethylmethacrylate powder, 38.5 g. (0.5 mol) of ammonium acetate, and 500 ml. of glycol were heated in a stirred autoclave for seven hours at 200° C. The reaction product in this case was somewhat more strongly cohered than in water, since the reaction product absorbs a small amount of glycol which acts as a plasticizer. The reaction product had a methoxyl content of 17% and a nitrogen content of 5.5%.

Example 6

150 g. of a copolymer containing 80% by weight of methylmethacrylate and 20% by weight of methacrylamide were heated in a stirred autoclave for seven hours at 240° C. with 3 liters of a 3.6% aqueous solution of methylammonium acetate. The reaction product was insoluble in water, but soluble in dimethyl formamide and formic acid. These solutions can be formed into films and fibers. Infrared spectral analysis showed the presence of a macromolecular compound which contained unsubstituted methacrylimide groups as well as N-methylmethacrylimide groups.

Example 7

150 g. of a copolymer of 65% by weight of methylmethacrylate, 25% by weight of alpha-methyl styrene, and 10% by weight of methacrylamide were heated in a stirred autoclave for seven hours at 240° C. with 100 g. of ammonium acetate and 1 liter of water. The reaction product was obtained in the form of a practically colorless water-insoluble resin. The infrared spectrum indicated the presence of imide groups and of mono-substituted aromatic compounds. An —$OCH_3$ determination showed about 10% of unreacted methylmethacrylate groups. A Kjeldahl nitrogen determination showed 5.4% N. The reaction product, like that in Example 6, could be formed into films and fibers.

Example 8

150 g. of a copolymer containing 85% by weight of methylmethacrylate and 15% by weight of methacrylonitrile were heated in a stirred autoclave for seven hours at 240° C. with 130 g. of ammonium acetate and 1 liter of water. The reaction product still contained about 8% of unchanged methylmethacrylate groups. In addition, only methacrylimide groups could be shown to the present. The reaction product was insoluble in acetone, ethyl acetate, and benzene.

Example 9

150 g. of a copolymer of 80% by weight of methylmethacrylate and 20% by weight of methacrylic acid were heated for seven hours at 240° C. in a stirred autoclave with 110 g. of ammonium acetate in 1 liter of water. The reaction product was practically identical with that in Example 3, but the —$OCH_3$ content was somewhat smaller, about 3%.

Example 10

150 g. of a copolymer of 65% by weight of methacrylic acid and 20% by weight of methylmethacrylate were heated in a stirred autoclave at 240° C. with 54 g. of ammonium acetate and 1 liter of water for seven hours. The reaction product was insoluble in water, benzene, acetone, and ethyl acetate. Films could be prepared from solutions of the product in dimethyl formamide and formic acid. The reaction product still contained about 5% of methacrylic acid groups, in addition only to methacrylimide groups.

Although specific examples have been herein shown and described, it is to be understood that they are illustrative and are not to be construed as limiting on the scope or spirit of the invention.

What is claimed is:

1. The method of making imide-containing polymers which comprises reacting an aqueous solution of a member selected from the group consisting of water-soluble ammonium salts and water-soluble N-alkyl ammonium salts at a temperature between about 180° C. and 300° C. with a polymer selected from the group consisting of homopolymers of esters of methacrylic acid with an alcohol having up to 6 carbon atoms, copolymers of said esters with up to about 70 percent by weight of other methacrylyl monomers, and copolymers of said esters with up to about 45 percent by weight of vinyl monomers.

2. The method as in claim 1 wherein said polymer is a homopolymer of an ester of methacrylic acid.

3. The method as in claim 1 wherein said polymer is a copolymer of a methacryl acid ester and another methacrylyl monomer.

4. The method as in claim 1 wherein said polymer is a copolymer of a methacrylic acid ester and a vinyl monomer.

5. The method as in claim 1 wherein said solution contains ammonium salts.

6. The method of imidizing polymethylmethacrylate which comprises reacting the polymer at a temperature between about 180° C. and about 300° C. with an aqueous solution containing up to about 2 mols, per mol of ester groups in the polymer, of a member selected from the group consisting of water-soluble N-alkyl ammonium salts and water-soluble ammonium salts.

References Cited by the Examiner

UNITED STATES PATENTS

| | | | |
|---|---|---|---|
| 2,146,209 | 2/1939 | Graves | 260—80 |
| 3,076,809 | 2/1963 | Johnson | 260—281 |

JOSEPH L. SCHOFER, *Primary Examiner.*

JOSEPH R. LIBERMAN, *Examiner.*